United States Patent [19]
Kamikubo

[11] Patent Number: 5,905,763
[45] Date of Patent: May 18, 1999

[54] RECEIVING APPARATUS AND DECODER

[75] Inventor: Yasunobu Kamikubo, Kanagawa, Japan

[73] Assignee: Sony Corporation, Tokyo, Japan

[21] Appl. No.: 08/958,150

[22] Filed: Oct. 27, 1997

[30] Foreign Application Priority Data

Nov. 5, 1996 [JP] Japan .................................. 8-292846

[51] Int. Cl.$^6$ .................................................. H04L 27/14
[52] U.S. Cl. ........................................ 375/334; 329/300
[58] Field of Search .................................. 375/334, 272, 375/316, 340; 331/179; 329/300

[56] References Cited

U.S. PATENT DOCUMENTS

| 4,486,715 | 12/1984 | Maas et al. | ............................. 375/334 |
| 4,574,247 | 3/1986 | Jacob | ....................................... 375/334 |

*Primary Examiner*—Temesghen Ghebretinsae
*Attorney, Agent, or Firm*—Ronald P. Kananen

[57] ABSTRACT

In an FSK receiving apparatus, a quadrature FSK-modulated signal is received at an I/F unit and demodulated, the state of the frequency eccentricity is detected at a comparator, and the signal as the result thereof is input to a decoder. In the decoder, a clock generation unit generates a sampling signal of a frequency of a predetermined number of times the rate of transfer of one bit of data under the control of a clock control unit, a shift register samples the signal output from the comparator based on this signal and successively records the bits of the sampling, and a data decision unit ignores bits of the sampling at the beginning and end and reads the remaining bits of the sampling at a point of time when one bit of data worth of bits of the sampling are stored, counts the number of bits of the value "1" in this, and decides that the bit of the transferred data is "1" when the count is at least a specific number while decides that the bit of the transferred data is "0" when it is less than the specific number, whereby correct decoding can be carried out even if the frequency is eccentric.

14 Claims, 5 Drawing Sheets

RECEIVING APPARATUS AND DECODER

BACKGROUND OF THE INVENTION

1. Field of the Invention

The present invention relates to a receiving apparatus such as a pager capable of correctly receiving and reproducing a signal transmitted from a base station modulated by the quadrature frequency shift keying (FSK) system and a decoder capable of correctly reproducing data from such a quadrature FSK modulated signal.

2. Description of the Related Art

First, an explanation will be made of the method of data reception of a pager or other receiving apparatus which receives a quadrature FSK modulated signal and decodes the transferred data. Note that, here, the explanation will be made by taking as an example a receiving apparatus based on the comparator system.

Such a receiving apparatus first receives an FM-modulated signal transmitted from the base station, demodulates it to obtain an analog waveform as shown in FIG. 1A, and compares signals detected corresponding to different carrier frequencies by a comparator to obtain a comparator output signal as shown in FIG. 1B.

It then inputs this comparator output signal to a decoder 10 as shown in FIG. 2 so as to decode the contained data.

The decoder 10 shown in FIG. 2 samples the comparator output signal shown in FIG. 1B at a frequency of a predetermined multiple (x multiple) of the data reception rate and sequentially inputs the obtained bits of the sampling to a shift register. When x-1 number of bits of the sampling are stored in the shift register 1, a data discrimination unit 2 makes a majority decision from the stored bits of the sampling to decide what the bit of the transferred data is.

More specifically, when the comparator output signal is sampled by for example a sampling frequency 16 times the data reception rate, the number of "0"s of the stored bits of the sampling and the number of "1"s of the stored bits of the sampling are compared at a point of time when 15 bits of the sampling are stored in the shift register. When the number of "1" bits of the sampling is eight or more, the bit of the transferred data is decided to be "1", while when the number of "1" bits of the sampling is seven or less, the bit of the transferred data is decided to be "0".

After such a decision is made with respect to one bit of the transferred data, the same processing is immediately repeated with respect to the next bit of the transferred data so as to successively receive the transferred data.

In such a receiving apparatus, however, there are disadvantages that there is a possibility of erroneous reproduction of data and the reliability is not sufficient.

As shown in FIGS. 1A and 1B, there is no disadvantage when the demodulated waveform is theoretical, that is, "clean", but the signal demodulated from the signal which is actually received at the receiving apparatus is "dirty" as shown in FIG. 3A. When there is a succession of "0" bits of data for example, as shown in FIG. 3A, that is, when the bits of the quadrature FSK modulated data change from "00" to "10" or from "10" to "00", the demodulated waveform ends up passing through a region of "1" for a certain extent of time, so there is a disadvantage that the data of one part of the output of the comparator is different. Namely, as indicated by the hatching in FIG. 3B, the bit which originally must be "0" ends up becoming "1". The part of this hatching becomes narrower or wider according to the inclination of the waveform.

When it is desired to reproduce the data shown in FIG. 3B by the decoder of the related art comprising a circuit configuration as shown in FIG. 2, there is a possibility that erroneous data will be reproduced, particularly in a case where the part of the hatching of FIG. 3B becomes wider.

In order to make this part narrower, the value of the threshold value may be changed, but there also exists a possibility that the data of the comparator output per se will become different.

Further, where noise is contained in the data, there is a possibility that the data will be erroneously reproduced due to the noise.

SUMMARY OF THE INVENTION

A first object of the present invention is to provide a receiving apparatus free from erroneous decoding of the received data and having a high reliability.

A second object of the present invention is to provide a decoder having a high reliability capable of suitably carrying out the decoding of data from a quadrature FSK demodulated signal.

In order to achieve the above objects, the inventors took note of the fact that the parts of a signal near the beginning and end of the period of transfer of one bit of transferred data tend to be eccentric in frequency or contain noise and designed the system so that the data is decoded by using the part of the signal near the center of the transfer period.

According to a first aspect of the present invention, there is provided a receiving apparatus comprising a demodulating means for receiving a transmitted signal and demodulating the received signal, a signal processing means for comparing signals detected corresponding to predetermined different carrier frequencies from the demodulated signal and generating a signal indicating the frequency of the transmitted signal, a data extracting means for sampling the generated signal at a predetermined sampling rate higher than the data transfer rate of the signal and extracting bits of the sampling of a predetermined part of a period corresponding to the transfer of one bit of data of the signal to output an extracted specific number of the bits of the sampling, and a discriminating means for deciding the value appearing the greatest number of times among the extracted specific number of the bits of the sampling as the bit of the transferred data and outputting the same.

Preferably, the data extracting means has a clock generating means for generating a sampling clock of a rate of a predetermined multiple of the data transfer rate; a sampling means for sampling the generated signal based on the generated sampling clock; and a data selecting means for ignoring specific numbers of the bits of the sampling at the beginning and end and selecting a remaining specific number of the bits of the sampling near the approximate center.

Further, preferably, the sampling means has a shift register and successively records the bits of the sampling in the shift register while successively shifting the same; and the data selecting means outputs a specific number of the bits of the sampling near the approximate center in the shift register.

According to a second aspect of the present invention, there is provided a decoder for reproducing original data based on a signal, indicating a frequency of a transmitted signal, generated by demodulating a signal transferred at a predetermined transfer rate and comparing signals detected corresponding to predetermined different carrier frequencies from the demodulated signal, comprising a clock generating means for generating a sampling clock of a rate a predetermined multiple of the data transfer rate; a sampling means for sampling the generated signal based on the generated sampling clock; a data selecting means for ignoring a specific number of the bits of the sampling at the beginning and end and selecting a remaining specific number of the bits of the sampling at the approximate center; and a discriminating means for deciding the value appearing the greatest number of times among the extracted specific number of the bits of the sampling as the bit of the transferred data and outputting the same.

Preferably, the clock generating means generates a sampling clock of a period corresponding to a rate 32 times the data transfer rate; the sampling means samples the generated signal at a sampling frequency 32 times the data transfer rate based on the sampling clock; the data selecting means ignores the 8 bits of the sampling at the beginning and end and selects the remaining 15 bits near the approximate center; and the discriminating means counts the number of bits having a predetermined first value (for example "1") from the extracted 15 bits of the sampling and decides that the bit of the transferred data is the predetermined first value when the counted value is at least eight while decides that the bit of the transferred data is a predetermined second value (for example "0") when the counted value is not more than seven.

According to a third aspect of the present invention, there is provided a receiving apparatus comprising a demodulating means for receiving a transmitted signal modulated by the frequency shift keying (FSK) system and demodulating the received signal, a signal processing means for comparing signals detected corresponding to predetermined different carrier frequencies from the demodulated signal and generating a signal indicating the frequency of the transmitted signal, a data extracting means for sampling the generated signal at a predetermined sampling rate higher than the data transfer rate of the signal and extracting bits of the sampling near the approximate center of a period corresponding to the transfer of one bit of data of the signal to output an extracted predetermined number of the bits of the sampling, and a discriminating means for deciding the value appearing the greatest number of times among the extracted predetermined number of the bits of the sampling as the bit of the transferred data and outputting the same.

Preferably, the data extracting means has a clock generating means for generating a sampling clock of a rate of a predetermined multiple of the data transfer rate; a sampling means for sampling the generated signal based on the generated sampling clock; and a data selecting means for ignoring predetermined numbers of the bits of the sampling at the beginning and end and selecting a remaining predetermined number of the bits of the sampling near the approximate center.

Further, preferably, the sampling means has a shift register and successively records the bits of the sampling in the shift register while successively shifting the same; and the data selecting means outputs a predetermined number of the bits of the sampling near the approximate center in the shift register.

According to a fourth aspect of the present invention, there is provided a decoder for reproducing original data based on a signal, indicating a frequency of a transmitted signal, generated by demodulating an FSK signal transferred at a predetermined transfer rate and comparing signals detected corresponding to predetermined different carrier frequencies from the demodulated signal, comprising a clock generating means for generating a sampling clock of a rate a predetermined multiple of the data transfer rate; a sampling means for sampling the generated signal based on the generated sampling clock; a data selecting means for ignoring a predetermined number of the bits of the sampling at the beginning and end and selecting a remaining predetermined number of the bits of the sampling at the approximate center; and a discriminating means for deciding the value appearing the greatest number of times among the extracted predetermined number of the bits of the sampling as the bit of the transferred data and outputting the same.

Preferably, the FSK signal is a quadrature FSK signal; the clock generating means generates a sampling clock of a period corresponding to a rate 32 times the data transfer rate: the sampling means samples the generated signal at a sampling frequency 32 times the data transfer rate based on the sampling clock; the data selecting means ignores the 8 bits of the sampling at the beginning and end and selects the remaining 15 bits near the approximate center; and the discriminating means counts the number of bits having the predetermined first value from the extracted 15 bits of the sampling and decides that the bit of the transferred data is the predetermined first value when the counted value is at least eight while decides that the bit of the transferred data is the predetermined second value when the counted value is not more than seven.

BRIEF DESCRIPTION OF THE DRAWINGS

These and other objects and features of the present invention will become clearer from the following description of the preferred embodiments given with reference to the attached drawings, wherein:

FIGS. 1A and 1B are views of theoretical signal waveforms in the case of receiving a signal modulated by the quadrature FSK system, in which FIG. 1A is a view of a signal obtained by demodulating the received signal and FIG. 1B is a view showing a comparator output signal;

FIGS. 3A and 3B are views of actual signal waveforms in the case of receiving a signal modulated by the quadrature FSK system, in which FIG. 3A is a view of a signal obtained by demodulating the received signal and FIG. 3B is a view of a comparator output signal;

DESCRIPTION OF THE PREFERRED EMBODIMENTS

First, an explanation will be made of an embodiment of the present invention referring to FIG. 4 and FIG. 5 taking as an example the case where the receiving apparatus of the present invention is applied to a pager.

Figure 4:
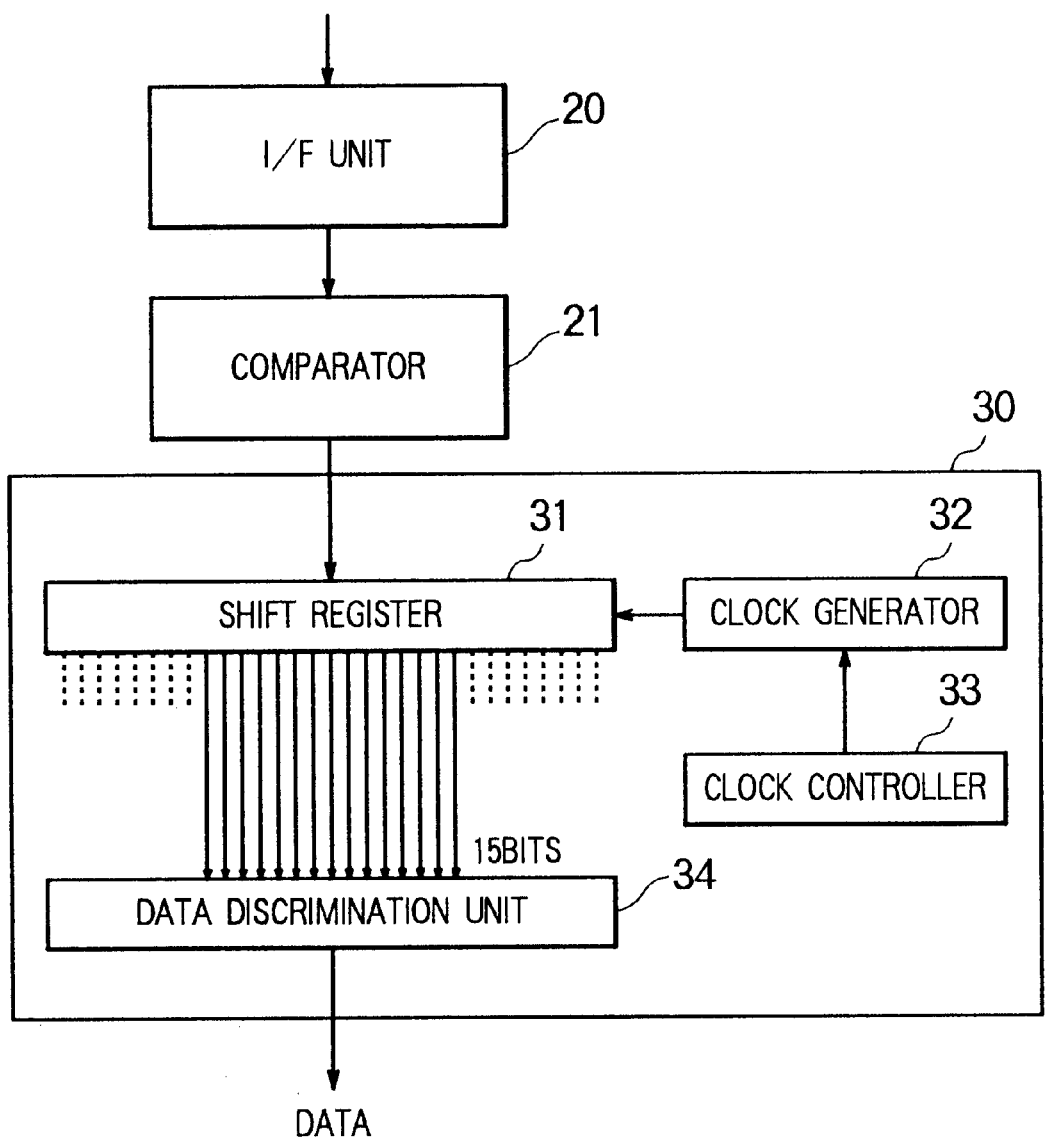
FIG. 4 is a block diagram of the configuration of a signal receiving unit of a pager according to an embodiment of the present invention.

FIG. 4 is a block diagram of the configuration of a signal receiving unit of a pager of the present embodiment.

The signal receiving unit of the pager comprises an intermediate frequency (I/F) unit 20, a comparator 21, and a decoder 30. Further, the decoder 30 comprises a shift register 31, a clock generator 32, a clock controller 33, and a data discrimination unit 34.

First, an explanation will be made of the configuration and function of the units of the signal receiving unit of the pager.

The I/F unit 20 receives and demodulates an FM-modulated signal transmitted from a base station and outputs the demodulated signal to the comparator 21.

The comparator 21 compares signals detected corresponding to predetermined different carrier frequencies from the demodulated signal input from the I/F unit 20, detects the state of the frequency eccentricity, and outputs a signal indicating the carrier frequency to the decoder 30.

The shift register 31 of the decoder 30 samples the comparator output signal input from the comparator 21 in synchronization with a predetermined sampling signal input from the clock generator 32 and successively stores the bits of the sampling. Then, it ignores predetermined numbers of the stored bits of the sampling at the beginning and end of the stored bits and suitably outputs a predetermined number of the bits at the middle stored in the register to the data discrimination unit 34 upon request. In the present embodiment, this shift register 31 has the ability to store 31 bits, ignoring the 8 bits at the beginning and end of the stored bits of the sampling, and outputs the middle 15 bits to the data discrimination unit 34.

The clock generator 32 generates a clock for sampling and successively shifting the bits of the sampling in the shift register 31. The clock generator 32 generates a predetermined sampling signal by using an internal oscillator based on a control signal from the clock controller 33 and outputs this to the shift register 31.

The clock controller 33 is a control unit for controlling the generation of the sampling signal in the clock generator 32. It determines the period of the comparator output signal to be sampled at the shift register 31 based on a control signal from a not illustrated higher control unit and controls the clock generator 32 so that the clock generator 32 generates the sampling signal with this period. In the present embodiment, the clock controller 33 controls the clock generator 32 so that it generates a sampling signal of a period of $1/32$ of the transfer time of one bit of data to be transmitted.

The data discrimination unit 34 decides what the bit of the transferred data is, that is, whether it is "1" or "0", based on the input from the shift register 31. The 15 bits of the sampling left after ignoring the 8 bits at the beginning and the end of the 31 stored bits of the sampling are input from the shift register 31 to the data discrimination unit 34. The data discrimination unit 34 counts the number of bits having the value of "1" from these input 15 bits of the sampling and decides that the bit of the transferred data is "1" when the result of the count is eight or more and that the bit of the transferred data is "0" when it is seven or less. That is, whichever of the value of "1" or "0" is greatest in the input predetermined number of bits of the sampling is output as the bit of the transferred data. Note that, the operation of the discrimination processing in the data discrimination unit 34 is carried out at a timing based on a signal input from a not illustrated control unit in decoder 30, synchronized with the sampling signal generated in the clock generator 32, and having the same period as the data transfer rate.

Next, an explanation will be made of the operation of the signal receiving unit of a pager by referring to FIG. 5.

Figures 1A, 1B:
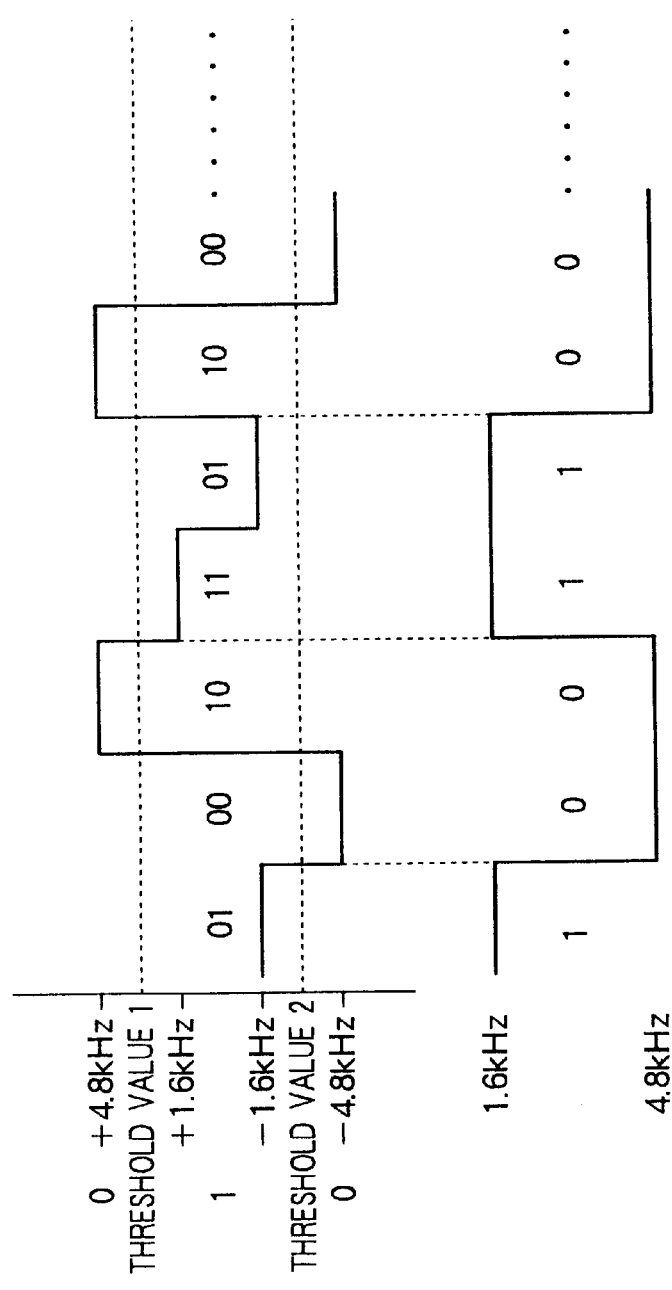
Figure 2:
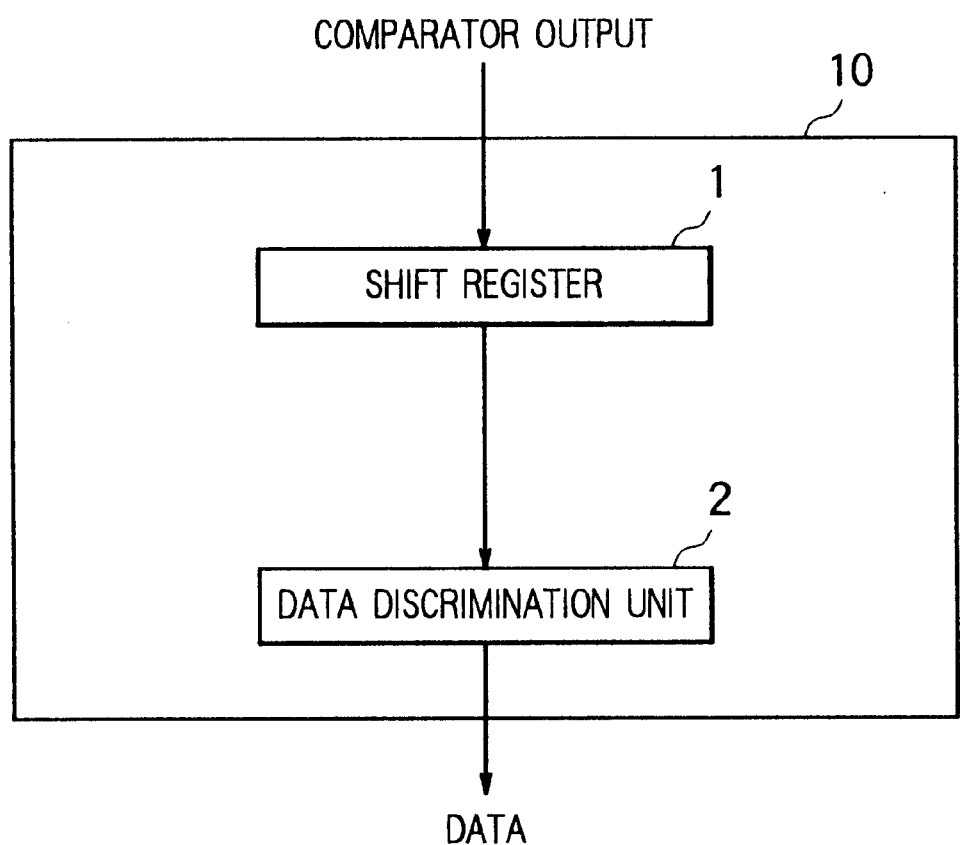
FIG. 2 is a block diagram of the configuration of a signal receiving unit of a pager of the related art.
Figure 3:
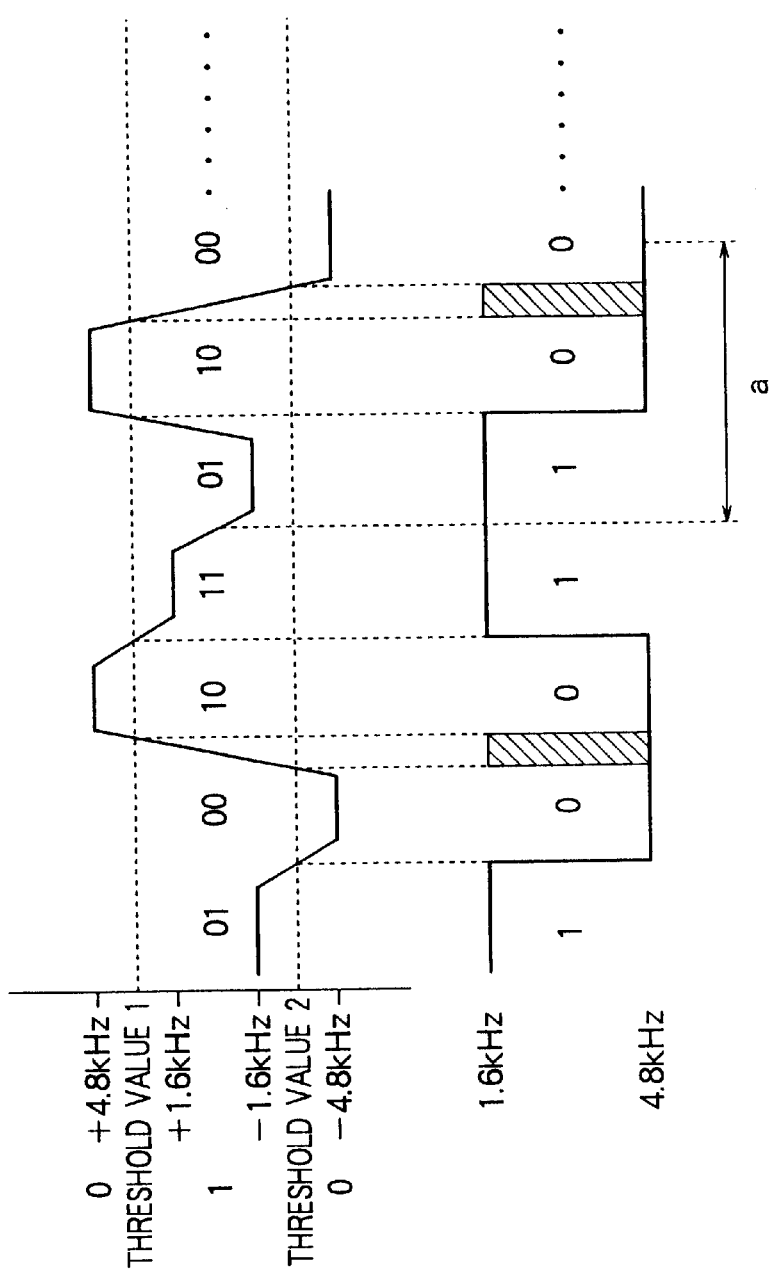
Figure 5:
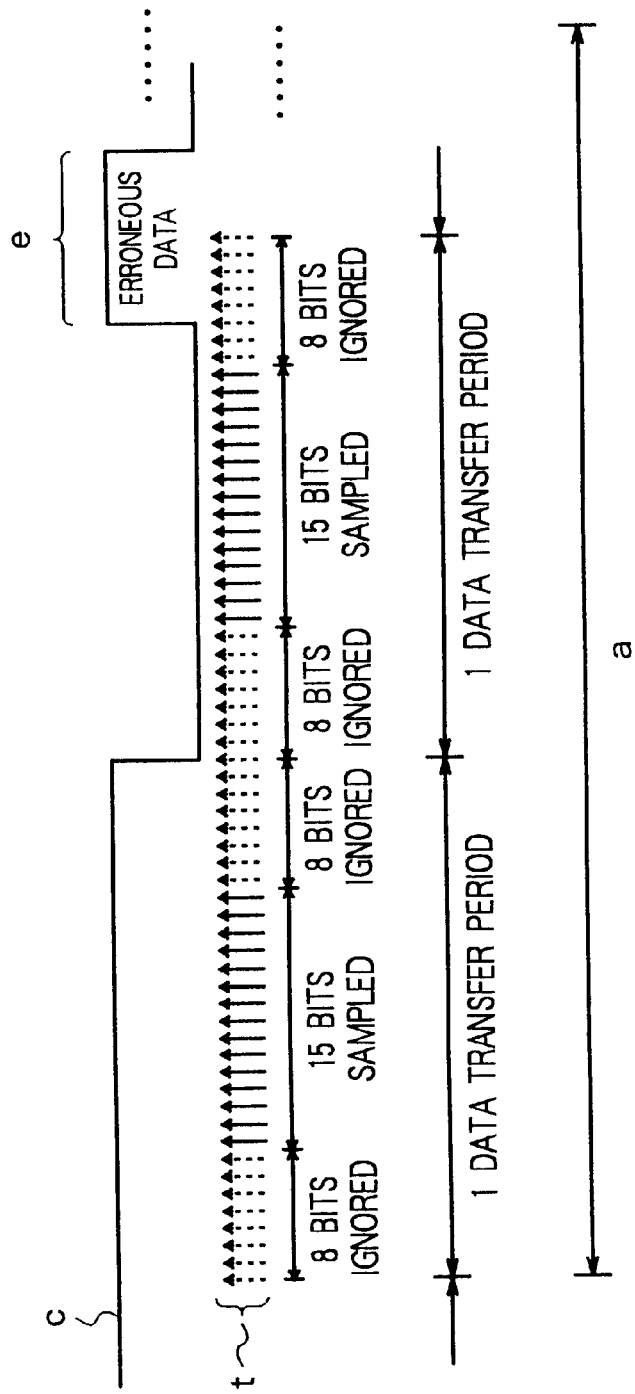
FIG. 5 is a view of the state of sampling in a shift register with respect to the output signal of the comparator of a signal receiving unit of the pager shown in FIG. 4.

FIG. 5 is a view of the state of sampling in the shift register 31 with respect to an output signal of the comparator 21. In the figure, a signal c is the comparator output signal, and a signal t is the sampling timing in the shift register 31. Note that, a period a shown in FIG. 5 corresponds to the period a in FIG. 3B mentioned above.

First, the FM-modulated signal transmitted from the base station is received at the I/F unit 20 and demodulated, the state of frequency eccentricity is detected at the comparator 21, and the signal c of the result thereof is input to the decoder 30.

In the decoder 30, the clock generator 32 is controlled based on an instruction from a higher controller input to the clock controller 33. The clock generator 32 generates a clock as shown in FIG. 5 at a rate 32 times the transfer rate of one bit of data as the sampling signal t and outputs the same to the shift register 31. Based on this sampling signal t, the shift register 31 samples the signal output from the comparator 20 and successively shifts the bits in the shift register 31.

At the point of time when one bit of the transferred data worth of the bits of the sampling are assembled, that is, at the point of time when 31 bits of the sampling are stored in the shift register 31, the data discrimination unit 34 ignores the 8 bits of the sampling at each of the beginning and end of the 31 bits and reads the remaining 15 bits, that is, de facto carries out another round of sampling, and counts the number of bits of the sampling having the value "1" in this. The data discrimination unit 34 decides that the bit of the transferred data is "1" when the counted value is eight or more and that the bit of the transferred data is "0" when it is seven or less and outputs the result of the decision as the bit of the transferred data.

This processing is then repeated so as to successively receive the signal transmitted modulated by the quadrature FSK transmitting apparatus.

Such a signal receiving unit of a pager suitably ignores from the sampling the erroneous parts of each bit of the transferred data occurring in the transitional portions of each bit in the comparator signal c as indicated by for example the period e in FIG. 5 (hatching part in FIG. 3B) and therefore enables sampling of only the stable part of each bit of data. As a result, the data is no longer decoded to erroneous values and correct data can be always received. Further, since the portions which would be unstable as the received signal are not used, there is greater resistance to other general noise, so the decoding can be carried out with a higher reliability.

Note that the present invention is not limited to only the present embodiment and may be modified in any desired manner.

For example, in the present embodiment, a period of $1/32$ of the period for transfer of one bit of data was defined as one sampling period, that is, the output of the comparator 21 was received by a clock of 32 times the data transfer rate, but the sampling frequency is not limited to this. For example, it is possible even if the sampling is carried out by a clock of 16 times. The sampling may be carried out by any clock, for example, one of 40 times, 64 times, 128 times, . . . , of the same.

In these cases, the number of bits of the sampling ignored at the beginning and end of each period of transfer of a bit of data and the number of bits of the sampling made valid can be freely set. It is possible, as in the above embodiment, to ignore $1/4$ (8 bits) of the bits of the sampling at the beginning and end and de facto sample the middle $1/2$ (15 bits) or so and possible to ignore for example $1/6$ of the bits of the sampling at the beginning and end and de facto sample the middle $2/3$ or so. These amounts can be freely set in accordance with the sampling frequency for the period of transfer of one bit of data, the transfer characteristic of the data, etc.

Further, in the present embodiment, the explanation was made of a case where a signal modulated by the quadrature FSK system was received, but the modulation system is not limited to this. The present invention can for example also be applied to multiple-value FSK systems higher than the quadrature system.

Further, the present invention is not limited in application to an apparatus for decoding data received by the comparator system and can be similarly applied to apparatuses for decoding data received by an A/D system.

Further, while the present embodiment was explained with reference to the case where the decoder was applied to a pager, but the decoder is not limited to only use for a pager. It can be used in any apparatus receiving a signal subjected to multiple value FSK.

Further, as the embodiment of the signal receiving unit of this pager, there can be usually considered for example a configuration in the I/F unit 20 and comparator 21 are formed by one reception IC and the decoder 30 is formed as one decoder IC, but the invention is not limited to such a configuration. For example, it is also possible to adopt a configuration in which the synchronization control unit of the decoder 30 (the clock generator 32 and the clock controller 33) is made separate from the decoder or conversely form everything from the I/F unit 20 to the decoder 30 as a single IC. Any of these embodiments is possible.

As explained above, according to the present invention, there is provided a decoder having a high reliability which enables suitable decoding of data based on a multiple value FSK demodulated signal. Further, a receiving apparatus having a high reliability free from decoding errors of the received data can be provided.

While the invention has been described by reference to specific embodiments chosen for purposes of illustration, it should be apparent that numerous modifications could be made thereto by those skilled in the art without departing from the basic concept and scope of the invention.

What is claimed is:

1. A receiving apparatus comprising:

a demodulating means for receiving a transmitted signal and demodulating the received signal;

a signal processing means for comparing signals detected corresponding to predetermined different carrier frequencies from said demodulated signal and generating a signal indicating the frequency of the transmitted signal;

a data extracting means for sampling said generated signal at a predetermined sampling rate higher than the data transfer rate of said transmitted signal and extracting bits of the sampling of a predetermined part of a period corresponding to the transfer of one bit of data to output an extracted specific number of the bits of the sampling; and a discriminating means for deciding the value appearing the greatest number of times among the extracted specific number of the bits of the sampling as the bit of the transferred data and outputting the same.

2. A receiving apparatus as set forth in claim 1, wherein said data extracting means comprises:

a clock generating means for generating a sampling clock of a rate of a predetermined multiple of the data transfer rate;

a sampling means for sampling the generated signal based on the generated sampling clock; and a data selecting means for ignoring a specific number of the bits of the sampling at the beginning and end and selecting a remaining specific number of the bits of the sampling near the approximate center.

3. A receiving apparatus as set forth in claim 2, wherein said sampling means comprises a shift register and successively records the bits of the sampling in the shift register while successively shifting the same; and said data selecting means outputs a specific number of the bits of the sampling near the approximate center in the shift register.

4. A receiving apparatus as set forth in claim 1, wherein said discriminating means counts the number of bits of the sampling having a predetermined first value from said extracted specific number of the bits of the sampling and decides that the bit of the transferred data is the predetermined first value when the counted value is at least said specific number, while decides that the bit of the transferred data is a predetermined second value when the counted value is less than said specific number.

5. A receiving apparatus as set forth in claim 2, wherein:

said clock generating means of said data extracting means generates a sampling clock of a period corresponding to a rate 32 times said data transfer rate;

said sampling means of said data extracting means samples said generated signal at a sampling frequency 32 times said data transfer rate based on said sampling clock to generate 31 bits of the sampling;

said data selecting means of said data extracting means ignores the 8 bits of the sampling at the beginning and end and selects the remaining 15 bits near the approximate center; and said discriminating means counts the number of bits having a predetermined first value from said extracted 15 bits of the sampling and decides that the bit of the transferred data is a predetermined first value when the counted value is at least eight while decides that the bit of the transferred data is the predetermined second value when the counted value is not more than seven.

6. A decoder for reproducing original data based on a signal, indicating a frequency of a transmitted signal, generated by demodulating a signal transferred at a predetermined transfer rate and comparing signals detected corresponding to predetermined different carrier frequencies from the demodulated signal, comprising:

a clock generating means for generating a sampling clock of a rate a predetermined multiple of the data transfer rate;

a sampling means for sampling the generated signal based on the generated sampling clock;

a data selecting means for ignoring a specific number of the bits of the sampling at the beginning and end and selecting a remaining specific number of the bits of the sampling at the approximate center; and a discriminating means for deciding the value appearing the greatest number of times among the selected specific number of the bits of the sampling as the bit of the transferred data and outputting the same.

7. A decoder as set forth in claim 6, wherein said clock generating means generates a sampling clock of a period corresponding to a rate 32 times the data transfer rate;

said sampling means samples said generated signal at a sampling frequency 32 times said data transfer rate based on said sampling clock;

said data selecting means ignores the 8 bits of the sampling at the beginning and end and selects the remaining 15 bits near the approximate center; and said discriminating means counts the number of bits having a predetermined first value from said selected 15 bits of the sampling and decides that the bit of the transferred data is a predetermined first value when the counted value is at least eight while decides that the bit of the transferred data is the predetermined second value when the counted value is not more than seven.

8. A receiving apparatus comprising:

a demodulating means for receiving a transmitted signal modulated by frequency shift keying (FSK) system and demodulating the received signal;

a signal processing means for comparing signals detected corresponding to predetermined different carrier frequencies from the demodulated signal and generating a signal indicating the frequency of the transmitted signal;

a data extracting means for sampling the generated signal at a predetermined sampling rate higher than the data transfer rate of the signal and extracting bits of the sampling near the approximate center of a period corresponding to the transfer of one bit of data of the signal to output an extracted predetermined number of the bits of the sampling; and a discriminating means for deciding the value appearing the greatest number of times among the extracted predetermined number of the bits of the sampling as the bit of the transferred data and outputting the same.

9. A receiving apparatus as set forth in claim 8, wherein said data extracting means comprises:

a clock generating means for generating a sampling clock of a rate of a predetermined multiple of the data transfer rate;

a sampling means for sampling the generated signal based on the generated sampling clock; and a data selecting means for ignoring predetermined numbers of the bits of the sampling at the beginning and end and selecting a remaining predetermined number of the bits of the sampling near the approximate center.

10. A receiving apparatus as set forth in claim 9, wherein said sampling means has a shift register and successively records the bits of the sampling in the shift register while successively shifting the same; and said data selecting means outputs a predetermined number of the bits of the sampling near the approximate center in the shift register.

11. A receiving apparatus as set forth in claim 8, wherein said discriminating means counts the number of bits of the sampling having a value of a predetermined first value from said extracted predetermined number of the bits of the sampling and decides that the bit of the transferred data is the predetermined first value when the counted value is at least said predetermined number, while decides that the bit of the transferred data is a predetermined second value when the counted value is less than said predetermined numsber.

12. A receiving apparatus as set forth in claim 9, wherein:

said received signal is a quadrature FSK signal;

said clock generating means of said data extracting means generates a sampling clock of a period corresponding to a rate 32 times said data transfer rate;

said sampling means of said data extracting means samples said generated signal at a sampling frequency 32 times said data transfer rate based on said sampling clock to generate 31 bits of the sampling;

said data selecting means of said data extracting means ignores the 8 bits of the sampling at the beginning and end and selects the remaining 15 bits near the approximate center; and said discriminating means counts the number of bits having a value of a predetermined first value from said extracted 15 bits of the sampling and decides that the bit of the transferred data is a predetermined first value when the counted value is at least eight while decides that the bit of the transferred data is the predetermined second value when the counted value is not more than seven.

13. A decoder for reproducing original data based on a signal, indicating a frequency of a transmitted signal, generated by demodulating an FSK signal transferred at a predetermined transfer rate and comparing signals detected corresponding to predetermined different carrier frequencies from the demodulated signal, comprising:

a clock generating means for generating a sampling clock of a rate a predetermined multiple of the data transfer rate;

a sampling means for sampling the generated signal based on the generated sampling clock;

a data selecting means for ignoring a predetermined number of the bits of the sampling at the beginning and end and selecting a remaining predetermined number of the bits of the sampling at the approximate center; and a discriminating means for deciding the value appearing the greatest number of times among the selected predetermined number of the bits of the sampling as the bit of the transferred data and outputting the same.

14. A decoder as set forth in claim 13, wherein:

said FSK signal is a quadrature FSK signal;

said clock generating means generates a sampling clock of a period corresponding to a rate 32 times the data transfer rate;

said sampling means samples said generated signal at a sampling frequency 32 times said data transfer rate based on said sampling clock;

said data selecting means ignores the 8 bits of the sampling at the beginning and end and selects the remaining 15 bits near the approximate center; and said discriminating means counts the number of bits having a value of a predetermined first value from said selected 15 bits of the sampling and decides that the bit of the transferred data is a predetermined first value when the counted value is at least eight while decides that the bit of the transferred data is the predetermined second value when the counted value is not more than seven.

* * * * *

UNITED STATES PATENT AND TRADEMARK OFFICE
CERTIFICATE OF CORRECTION

PATENT NO. : 5,905,763
DATED : May 18, 1999
INVENTOR(S) : Yasunobu KAMIKUBO

It is certified that error appears in the above-identified patent and that said Letters Patent is hereby corrected as shown below:

Column 9, Line 54, Delete "numsber", and insert -- number -- therefor.

Signed and Sealed this

Eighth Day of February, 2000

Attest:

Q. TODD DICKINSON

Attesting Officer

Commissioner of Patents and Trademarks